No. 12,620. REISSUED MAR. 19, 1907.

E. E. SLICK.

APPARATUS FOR TRANSFERRING METAL BLOOMS, &c.

APPLICATION FILED JAN. 23, 1907.

2 SHEETS—SHEET 1.

WITNESSES

W. W. Swartz

R. A. Baldwin

INVENTOR

E. E. Slick

No. 12,620. REISSUED MAR. 19, 1907.
E. E. SLICK.
APPARATUS FOR TRANSFERRING METAL BLOOMS, &c.
APPLICATION FILED JAN. 23, 1907.
2 SHEETS—SHEET 2.
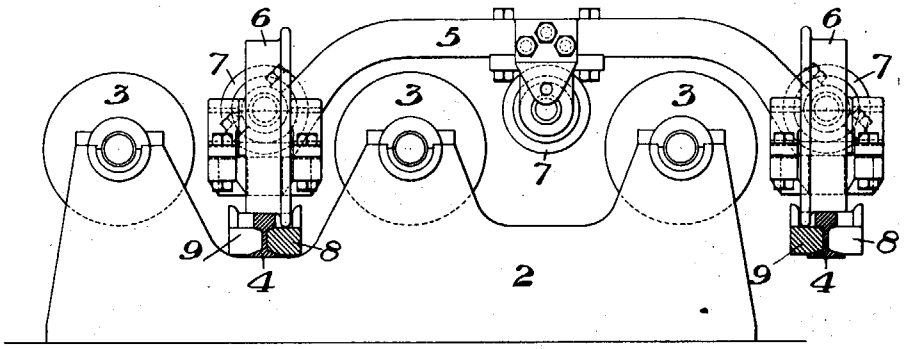
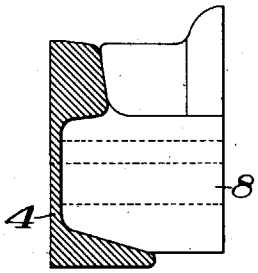
WITNESSES
W. W. Swartz
R. A. Balderson
INVENTOR
E. E. Slick

UNITED STATES PATENT OFFICE.

EDWIN E. SLICK, OF PITTSBURG, PENNSYLVANIA.

APPARATUS FOR TRANSFERRING METAL BLOOMS, &c.

No. 12,620. Specification of Reissued Letters Patent. Reissued Mar. 19, 1907.

Original No. 547,895, dated October 15, 1895. Application for reissue filed January 23, 1907. Serial No. 353,978.

*To all whom it may concern:*

Be it known that I, EDWIN E. SLICK, of Pittsburg, in the county of Allegheny and State of Pennsylvania, have invented a new and useful Improvement in Apparatus for Transferring Metal Blooms, &c., of which the following is a full, clear, and exact description, reference being had to the accompanying drawings, forming part of this specification, in which—

Figure 1:
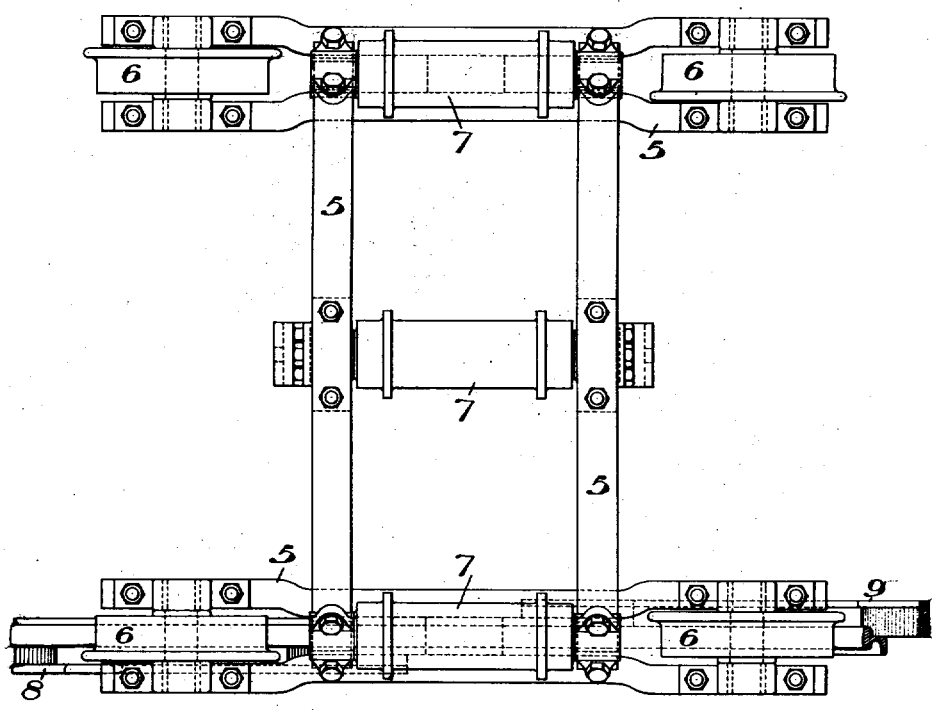
Figure 2:
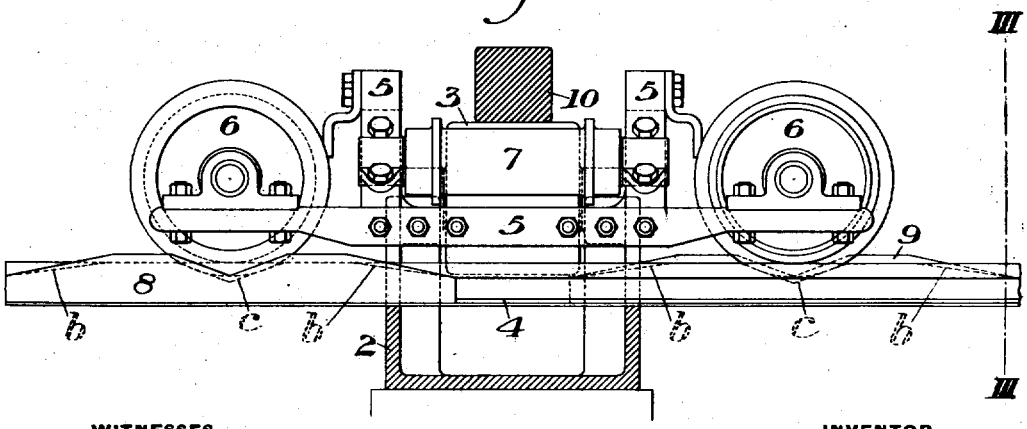

Figure 1 shows in plan view an ingot-carrying car adapted to form part of my improved apparatus for delivering blooms or ingots to the feed-tables of rolling-mills. Fig. 2 is a side elevation thereof shown in position in the feed-table and in the act of delivering a bloom thereto. Fig. 3 is an end elevation of the car and a side elevation of the feed-table, and Fig. 4 is a detail end view of one of the guide bars or rails.

The purpose for which I have especially designed my improvement is to afford means for transferring blooms and ingots of metal from cars to the feed-tables of rolling-mills; but while I make special claim to such application thereof I wish it to be understood that the invention as defined in my broad claims is not limited thereto, but that with suitable modifications the principles thereof may be applied to the depositing of covers on vertical heating-furnaces and to other uses, as will be understood by the skilled mechanic.

In the drawings, 2 represents the frame of the feed-table or conveying-table by which ingots, blooms, billets, &c., are conveyed in a rolling-mill to or from the rolls, and 3 3 are the driven rollers of such table.

4 4 are the rails of a track leading from a heating-furnace and extending transversely to the table and across the frame thereof, which frame is depressed or recessed, as shown in Fig. 3, in order to permit crossing of the rails.

5 is the frame or truck of a metal-carrying car mounted upon wheels 6 and provided with a suitable number of rollers or other cross-supports 7 for supporting the metal pieces. Rollers are preferred for this purpose; but fixed cross slats or bars may be substituted therefor. Beside the rails of the track at the place where it crosses the frame of the feed-table, and preferably fixed to the sides of the rails, are guide-bars or supplemental rails 8 9, set in such position that they will engage the flanges of the wheels 6 and formed with inclines *b* and with depressions *c*, so that when the cars pass thereover the wheel-flanges engaging these bars or supplemental rails will travel up the inclines so as to raise the car and will then descend in the depressions to lower the car, the position of the car when lowered being at the middle of the feed-table. As shown in Fig. 1, the flanges of the wheels at one end of the car are set at opposite sides of the wheel from the flanges at the other end of the car, the flanges of one pair being on the inner sides of the wheels and the flanges of the other pair being on the outer sides of the wheels. Correspondingly, the set of supplemental rails 8 on one side of the feed-table are placed on the outer side of the rails 4, while on the other side the set 9 are placed on the inner sides of said rails, so that the wheels having inner flanges will not engage the rails 8, while wheels having outer flanges will not engage the set 9. The rails 8 and 9 are so spaced apart that the flanges of the wheels engage the same simultaneously, thus lifting the car in vertical lines.

The operation is as follows: A billet or bloom 10 having been placed on the rollers of the car the car is drawn on its track up to and across the feed-table. The front wheels of the car, for the reasons above explained, pass the first pair of guide bars or rails without engaging them; but when they reach the second pair of guide bars or rails on the far side of the feed-table the flanges of both pairs of wheels, simultaneously engaging the inclined portions *b* of the respective guide bars or rails, ride up the same and lift the car, so that the metal piece thereon shall be elevated above the level of the feed-rollers 3. Then when the flanges of the wheels reach the depressions *c* they descend simultaneously in these depressions and lower the car, so as to bring the rollers 7 below the surfaces of the feed-rollers 3 and to deposit the metal piece upon the latter. The rotation of these feed-rollers then carries the metal piece from the car, and as the car is drawn forward the wheels rise on the inclines *c* and again descend to the level of the track.

It is clear that the car may be used not only for delivering metal pieces to the feed-table, as above explained, but also for removing them from the feed-table.

The advantages of my invention will be appreciated by those skilled in the art.

The apparatus is simple and automatic in its operation and affords a very efficient means for transferring and conveying metal.

Many changes in the form and arrangement of the parts may be made without departing from my invention, since

I claim—

1. The combination of a carriage provided with means for carrying a burden thereon, a track, and inclines arranged to move the carriage in parallel lines relatively to the track, said inclines affording an intermediate depression for the wheels; substantially as described.

2. The combination of a wheeled carriage provided with means for carrying a burden thereon, and a track having depressions provided with oppositely-facing inclines arranged to engage the wheels of the carriage and move them simultaneously in a vertical direction; substantially as described.

3. The combination of a car provided with means for carrying a burden thereon, a track, and sets of inclines arranged to engage the wheels of the car and to raise and lower the same simultaneously, one set of inclines being inoperative upon one set of wheels; substantially as described.

4. The combination of a feed-table, a metal-carrying car mounted on a track extending across the table, and inclines adapted to cause the car to move vertically relatively to the track; substantially as described.

5. The combination of a feed-table, a metal-carrying car mounted on a track extending across the table, and inclines adapted to cause the car to move vertically above and below the table, said track being provided with separate inclines for the front and rear wheels of the car respectively; substantially as described.

6. The combination of a feed-table, a metal-carrying car mounted on a track extending across the table, and inclines adapted to cause the car to move vertically above and below the table, said track being provided with separate inclines for the front and rear wheels of the car respectively, and said inclines being situate on respectively opposite sides of the rails, the wheels of the car having flanges also situate on respectively opposite sides of the wheels and adapted to engage the inclines; substantially as described.

In testimony whereof I have hereunto set my hand.

EDWIN E. SLICK.

Witnesses:
GEO. B. BLEMING,
RICHARD D. LITTLE